United States Patent Office 3,067,234
Patented Dec. 4, 1962

3,067,234
PRODUCTION OF ALKYL THIOBORIC ACID ESTERS
Konrad Lang, Leverkusen, Germany, assignor to Farbenfabriken Bayer Aktiengesellschaft, Leverkusen, Germany, a corporation of Germany
No Drawing. Filed Mar. 8, 1960, Ser. No. 13,661
Claims priority, application Germany Mar. 9, 1959
7 Claims. (Cl. 260—462)

The present invention relates to a new process of producing alkyl thioboric acid esters.

Esters of alkyl thioboric acid esters $RB(SR')_2$ and $R_2BSR'$ respectively have been described only quite recently. For instance dimethylthioboric acid methylester can be obtained by reacting tetramethyldiborane with methylmercaptan:

$$(CH_3)_4B_2H_2 + 2CH_3SH \rightarrow 2(CH_3)_2BSCH_3 + 2H_2$$

The reaction of boron trimethyl with thioboric acid trimethyl ester, which is catalyzed by the addition of diborane, yields methyl thioboric acid dimethyl ester or dimethyl thioboric acid methyl ester depending on the reaction conditions chosen:

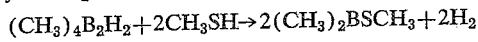

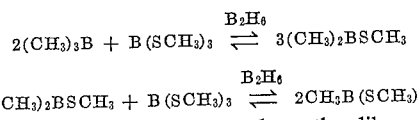

In order to produce stable products the diborane must be carefully removed from the reaction by repeated heating up. The starting materials required for the abovesaid reactions are not readily available. Tetraalkyldiboranes are obtained by reacting boron alkyls with the highly toxic and explosive diborane in a slowly proceeding reaction or by hydrogenating under pressure boron alkyls at about 200° C.; this process involves many risks. The thioboric acid esters $B(SR')_3$ are obtained by reacting heavy metal mercaptides (especially the silver and lead salts) with boron tribromide or by reacting sodium mercaptide (prepared by reacting mercaptan and a solution of sodium in liquid ammonia) with boron bromide.

Owing to the fact that the starting materials are only difficultly available the production of alkyl thioboric acid esters on a large scale has hitherto been proved uneconomical.

It is an object of the present invention to provide a novel and convenient process of producing alkyl thioboric acid esters.

Further objects of the invention will be apparent as the following description proceeds.

The invention is based on the discovery that alkyl thioboric acid esters can be obtained by reacting boron trialkyls with mercaptans. It has been found that boron trialkyls react with mercaptans with the splitting off hydrocarbon to form dialkyl thioboric acid esters already at temperatures between 20–100° C.:

(R and R′=alkyl)

The dialkyl thioboric acid esters thus obtained are further reacted with excess mercaptan at higher temperatures up to 200° C. to yield alkyl thioboric acid dialkyl esters:

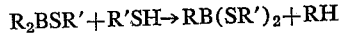

Thus, the production of alkyl thioboric acid dialkyl esters by the above described process can be represented by the following summation equation:

In practicing the process of the invention it has to be taken into consideration that a boron alkyl used as starting material is sensitive to oxygen; that means that the reaction has to be carried out in the presence of an inert gas. It has further to be taken into consideration that the substitution of the first alkyl group of boron alkyls by an alkyl thio residue frequently proceeds with substantial evolution of heat and at high velocity so that cooling has to be applied at this stage of the reaction. The substitution of the second alkyl group must be performed at higher temperatures.

The novel process of the invention constitutes a technical advantage in so far as it offers for the first time a simple and convenient process of producing alkyl thioboric acid esters from readily available starting products, namely boron trialkyls and mercaptans.

These alkyl thioboric acid esters are intermediates for preparing other organic boron-sulfur compounds, for instance alkyl boric acids. The alkyl boric acids are useful as stabilizers in lubricants.

The invention is further illustrated by the following example without being restricted thereto:

Example 1

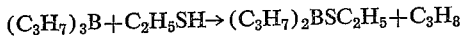

45 grams (0.72 mol) of ethyl mercaptan are added dropwise to 70 grams (0.5 mol) of boron tripropyl in a nitrogen atmosphere. The reaction heat is discharged by cooling with ice water. After the first reaction has subsided, the mixture is refluxed for 4 hours, any excess ethyl mercaptan is distilled off and the distillation residue is heated to reflux boiling by a short period of time. The dipropyl thioboric acid ethyl ester obtained in a quantitative yield is distilled off at 64–67° C. and 8–7 mm./Hg.

The reaction product is a very mobile colourless liquid which reacts with water by self-heating:

$$(C_3H_7)_2BSC_2H_5 + H_2O \rightarrow (C_3H_7)_2BOH + C_2H_5SH$$

The abovesaid compound is identified by the boron content of the thioester (calculated 6.8% boron, found 6.6; 7.0% boron) and determination of the mercaptan formed in hydrolysis.

Example 2

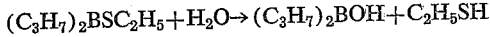

101 grams (0.5 mol) of dodecyl mercaptan are added dropwise to 84 grams (0.6 mol) of boron tripropyl in a nitrogen atmosphere with external cooling. The reaction starts at room temperature with the evolution of gas and is accelerated by heating (65% of the theoretical reaction at 90° C. within 25 minutes) and is completed by heating to 130° C. for one hour. The reaction is practically quantitative. The colourless liquid ester boils at 137° C./0.9 mm./Hg to 155° C./1.4 mm. Hg.

Example 3

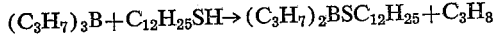

As described in Example 2 70 grams of boron tripropyl (0.5 mol) are reacted with 303 grams 1.5 mols) of dodecyl mercaptan, finally at 200° C. Thereupon, excess dodecyl mercaptan and the dipropyl thioboric acid dodecylester formed as a by-product are distilled off in vacuum. Propyl thioboric acid-bis-dodecylester is obtained as distillation residue.

I claim:
1. Process for preparing alkyl thioboric acid esters, which comprises reacting a boron trialkyl with an alkyl mercaptan in an inert atmosphere and recovering the alkyl thioboric acid ester thereby formed.
2. Process according to claim 1, in which said boron trialkyl is reacted with said alkyl mercaptan at a tempera- ture of about 20 to about 100° C. to thereby form a dialkyl thioboric acid mono alkyl ester.

3. Process according to claim 1, in which said boron trialkyl is reacted with said alkyl mercaptan at a temperature of about 200° C. to thereby form a mono-alkyl thioboric acid dialkyl ester.

4. Process for preparing alkyl thioboric acid esters, which comprises reacting a boron trialkyl with an alkyl mercaptan in an inert atmosphere in a first stage at a temperature of from about 20 to about 100° C. and thereafter in a second stage reacting the dialkyl thioboric acid mono-alkyl ester thereby formed with a further quantity of an alkyl mercaptan at a temperature of about 200° C. to obtain a mono-alkyl thioboric acid dialkyl ester.

5. Process for preparing dipropyl thioboric acid ethyl ester, which comprises reacting boron tripropyl with ethyl mercaptan in an atmosphere of nitrogen and recovering the dipropyl thioboric acid ethyl ester thereby formed.

6. Process for preparing dipropyl thioboric acid dodecyl ester, which comprises reacting boron tripropyl with dodecyl mercaptan in an atmosphere of nitrogen and recovering the dipropyl thioboric acid dodecyl ester thereby formed.

7. Process for preparing propyl thioboric acid didodecyl ester, which comprises reacting boron tripropyl with dodecyl mercaptan at a temperature which ranges from room temperature to 130° C. and thereafter reacting the dipropyl thioboric acid dodecyl ester thereby formed with a further quantity of dodecyl mercaptan at a temperature of about 200° C. to obtain said propyl thioboric acid didodecyl ester.

References Cited in the file of this patent
UNITED STATES PATENTS 2,160,917    Shoemaker et al. _____ June 6, 1939

OTHER REFERENCES

Wertheim: Textbook of Organic Chemistry, McGraw-Hill Book Co., New York, 1951, page 132.

Lappert: Chemical Reviews, vol. 56, page 1012 (1956).